(12) United States Patent
Jung et al.

(10) Patent No.: US 8,126,282 B2
(45) Date of Patent: Feb. 28, 2012

(54) IMAGE ENCODING APPARATUS AND IMAGE DECODING APPARATUS

(75) Inventors: Jae-woo Jung, Cheonan-si (KR); Hyun-mun Kim, Seongnam-si (KR); Dae-hee Kim, Suwon-si (KR); Dae-sung Cho, Seoul (KR); Woong-II Choi, Hwanseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 724 days.

(21) Appl. No.: 12/289,608

(22) Filed: Oct. 30, 2008

(65) Prior Publication Data

US 2009/0190843 A1 Jul. 30, 2009

(30) Foreign Application Priority Data

Jan. 30, 2008 (KR) .................. 10-2008-0009682

(51) Int. Cl.
*G06K 9/36* (2006.01)
*G06K 9/46* (2006.01)

(52) U.S. Cl. .................. 382/238; 382/239; 382/233
(58) Field of Classification Search .................. None
See application file for complete search history.

(56) References Cited

U.S. PATENT DOCUMENTS

| | | | | |
|---|---|---|---|---|
| 5,696,848 A | * | 12/1997 | Patti et al. | 382/254 |
| 6,091,777 A | * | 7/2000 | Guetz et al. | 375/240.11 |
| 6,256,346 B1 | * | 7/2001 | Yamaguchi et al. | 375/240.12 |
| 6,934,420 B1 | * | 8/2005 | Hsu et al. | 382/252 |
| 7,274,825 B1 | * | 9/2007 | Lee et al. | 382/239 |
| 7,884,742 B2 | * | 2/2011 | Puri et al. | 341/67 |
| 2007/0189621 A1 | * | 8/2007 | Liu | 382/239 |
| 2007/0258518 A1 | * | 11/2007 | Tu et al. | 375/240.03 |
| 2008/0130754 A1 | * | 6/2008 | Winger | 375/240.21 |

* cited by examiner

*Primary Examiner* — Yuzhen Ge
(74) *Attorney, Agent, or Firm* — Staas & Halsey LLP

(57) ABSTRACT

Provided are an image encoding apparatus and an image decoding apparatus. The image encoding apparatus includes a compression unit compressing a reference image by reducing a resolution of the reference image in a resolution adjustment mode determined from among at least two resolution adjustment modes according to a distribution of values of pixels of the reference image, and providing the compressed reference image to a memory, a reconstruction unit reconstructing the reference image by increasing a resolution of the compressed reference image stored in the memory to an original resolution, a predictive encoding unit performing predictive encoding on a current image by using the reconstructed reference image, and a predictive decoding unit generating the reference image by performing decoding on the predictive encoded current image, and providing the generated reference image to the compression unit.

12 Claims, 7 Drawing Sheets

| ReferenceFrame(){ | Bit Depth | REFERENCE NUMBER |
|---|---|---|
| for("all blocks") { | | (1) |
| MIN | 8 | |
| RANGE | 8 | |
| for ("4x4 block") { | | (2) |
| PIXEL | BIT_DEPTH_PIXEL | |
| } | | |
| } | | |
| } | | |

IMAGE ENCODING APPARATUS AND IMAGE DECODING APPARATUS

CROSS-REFERENCE TO RELATED PATENT APPLICATION

This application claims the benefit of Korean Patent Application No. 10-2008-0009682, filed on Jan. 30, 2008, in the Korean Intellectual Property Office, the disclosure of which is incorporated herein in its entirety by reference.

BACKGROUND

1. Field

One or more embodiments of the present invention generally relate to image encoding and decoding, and more particularly, to an image encoding apparatus and an image decoding apparatus, whereby a reference image is stored in a memory after its size is reduced in order to reduce the number of operation cycles required for a write operation and a read operation for the reference image.

2. Description of the Related Art

In a video codec, a reconstructed image of a previous frame has to be stored in order to perform motion prediction or motion compensation on a current frame. The reconstructed image of the previous frame is usually stored in an external memory located outside the video codec because of its large data size. It is a general feature that the number of operation cycles required for a read operation or a write operation from or to the external memory is greater than that of operation cycles required for an arithmetic operation performed within the video codec.

SUMMARY

One or more embodiments of the present invention provide an image encoding apparatus and an image decoding apparatus, whereby the number of operation cycles required to read or write a reference image from or to a memory can be reduced.

Additional aspects and/or advantages will be set forth in part in the description which follows and, in part, will be apparent from the description, or may be learned by practice of the invention.

To achieve the above and/or other aspects and advantages, one or more embodiments of the present invention may include an image encoding apparatus comprising a compression unit to compress a reference image by reducing a resolution of the reference image in a resolution adjustment mode determined from among at least two resolution adjustment modes according to a distribution of values of pixels of the reference image, and to provide the compressed reference image to a memory, a reconstruction unit to reconstruct the reference image by increasing a resolution of the compressed reference image stored in the memory to an original resolution, a predictive encoding unit to perform predictive encoding on a current image by using the reconstructed reference image, and a predictive decoding unit to generate the reference image by performing decoding on the predictive encoded current image, and providing the generated reference image to the compression unit.

To achieve the above and/or other aspects and advantages, one or more embodiments of the present invention may include an image decoding apparatus comprising a compression unit to compress a reference image by reducing a resolution of the reference image in a resolution adjustment mode determined from among at least two resolution adjustment modes according to a distribution of values of pixels of the reference image, and to provide the compressed reference image to a memory, a reconstruction unit to reconstruct the reference image by increasing a resolution of the compressed reference image stored in the memory to an original resolution, and a predictive decoding unit to generate the reference image by performing predictive decoding on a bitstream by using the reconstructed reference image.

To achieve the above and/or other aspects and advantages, one or more embodiments of the present invention may include an image compression apparatus comprising a resolution adjustment mode determination unit to determine one of uniform quantization and dead-zone quantization as the resolution adjustment mode according to a result of comparison of a range value, for values of pixels constituting a current unit block of the reference image, with a threshold value and a result of comparison of the values of the pixels with a first sub range value and a second sub range value, a quantization unit to perform quantization in order to express each of the values of the pixels of the current unit block at a reduced bit resolution according to the determined resolution adjustment mode, and a fixed-length coding unit to perform fixed-length coding on a quantization index, a representative value, and the range value of the current unit block on which uniform quantization or dead-zone quantization is performed.

To achieve the above and/or other aspects and advantages, one or more embodiments of the present invention may include an image reconstruction apparatus including a fixed-length decoding unit to reconstruct a quantization index, a representative value, and a range value of a current unit block of a compressed reference image by performing fixed-length decoding on the current unit block, a resolution adjustment mode determination unit to determine one of uniform inverse quantization and dead-zone inverse quantization as the resolution adjustment mode, according to a result of comparison of the reconstructed range value of the current unit block with a threshold value and a result of checking of a flag, and an inverse quantization unit to inversely quantize the quantization index of the current unit block in order to express each of the values of the pixels of the current unit block at the original bit resolution, according to the determined resolution adjustment mode.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF THE EMBODIMENTS

Figure 1:
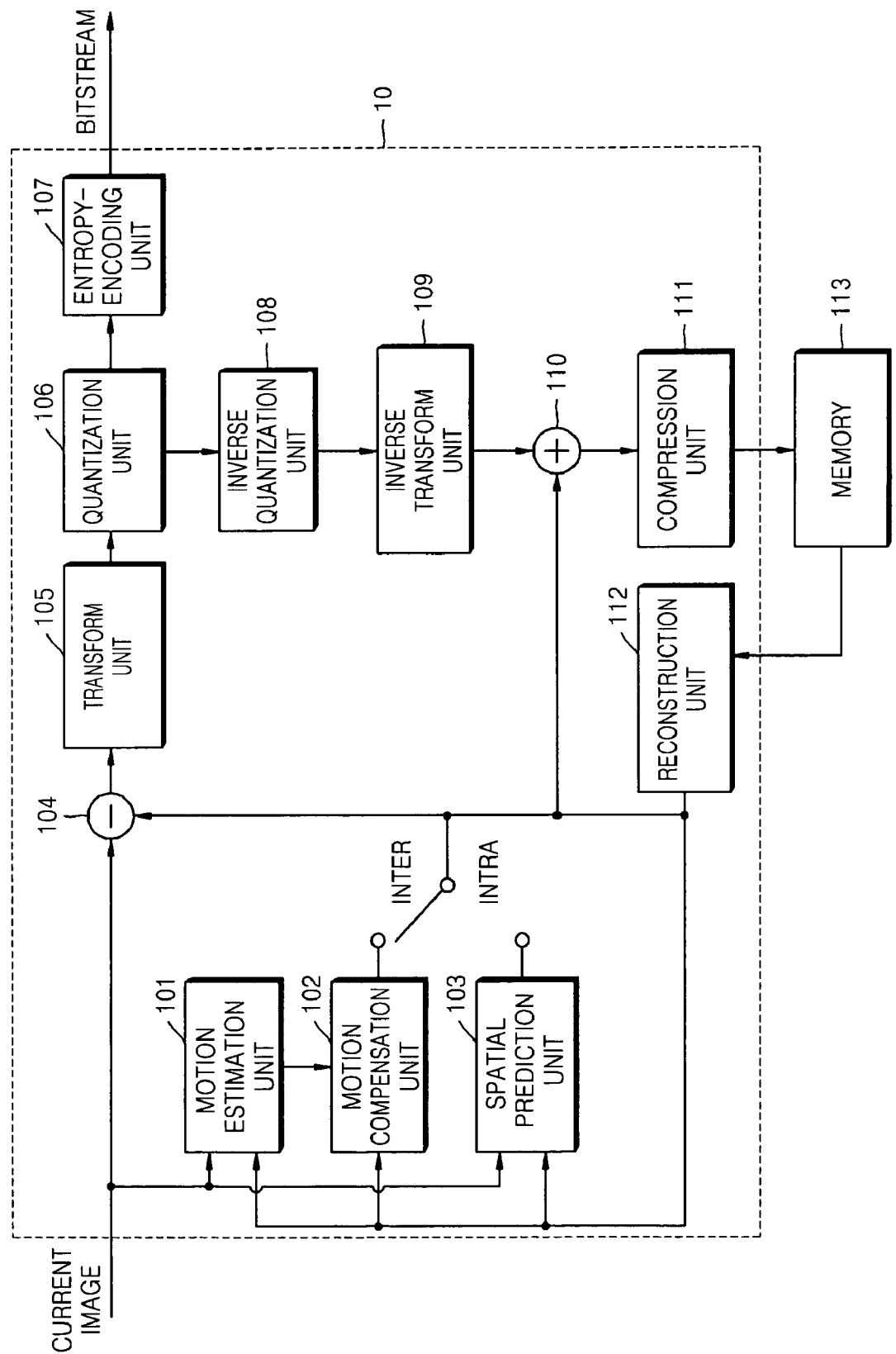
FIG. 1 is a block diagram of an image encoding apparatus according to an embodiment of the present invention.

Reference will now be made in detail to embodiments, examples of which are illustrated in the accompanying drawings, wherein like reference numerals refer to the like elements throughout. In this regard, embodiments of the present invention may be embodied in many different forms and should not be construed as being limited to embodiments set forth herein. Accordingly, embodiments are merely described below, by referring to the figures, to explain aspects of the present invention.

FIG. 1 is a block diagram of an image encoding apparatus 10 according to an embodiment of the present invention. The image encoding apparatus 10 includes a motion estimation unit 101, a motion compensation unit 102, a spatial prediction unit 103, a subtraction unit 104, a transform unit 105, a quantization unit 106, an entropy-encoding unit 107, an inverse quantization unit 108, an inverse transform unit 109, an addition unit 110, a compression unit 111, and a reconstruction unit 112.

Referring to FIG. 1, the motion estimation unit 101 estimates a motion of a current image of an image sequence based on at least one of a plurality of reference images reconstructed by the reconstruction unit 112. More specifically, for each of a plurality of blocks, corresponding to an inter mode, from among all blocks of the current image, the motion estimation unit 101 determines a block of a reference image, which best matches a block of the current image, from among the reference images reconstructed by the reconstruction unit 112 and calculates a motion vector indicating displacement between the determined block of the reference image and the block of the current image.

The motion compensation unit 102 generates a predicted image of the current image from at least one of the reference images reconstructed by the reconstruction unit 112 by using a result of the motion estimation performed by the motion estimation unit 101. More specifically, the motion compensation unit 102 generates the predicted image of the current image by using the values of the blocks of at least one reference image, which are indicated by the motion vector of each block of the current image calculated by the motion estimation unit 101.

For each of the blocks, corresponding to the intra mode, from among all the blocks of the current image, the spatial prediction unit 103 predicts a value of the block of the current image from a value of a block located adjacent to the block of the current image, from among all blocks of a reconstructed image generated by the reconstruction unit 112, in order to generate a predicted image of the current image.

The subtraction unit 104 subtracts the predicted image generated by the motion compensation unit 102 or the predicted image generated by the spatial prediction unit 103 from the current image, in order to generate a residue image between the current image and the predicted image.

The transform unit 105 transforms the residue image generated by the subtraction unit 104 from a spatial domain into a frequency domain. For example, the transform unit 105 may transform the residue image generated by the subtraction unit 104 from the spatial domain into the frequency domain by using discrete Hadamard transformation (DHT) or discrete cosine transformation (DCT). The quantization unit 106 quantizes transformation results obtained by the transform unit 105. More specifically, the quantization unit 106 divides the transformation results obtained by the transform unit 105, i.e., frequency component values, by a quantization step size, and approximates quantization results to integers.

The entropy-encoding unit 107 performs entropy-encoding on the quantization results obtained by the quantization unit 106, in order to generate a bitstream. For example, the entropy-encoding unit 107 may perform entropy-encoding on the quantization results obtained by the quantization unit 106 by using context-adaptive variable-length coding (CAVLC) or context-adaptive binary arithmetic coding (CABAC). In particular, the entropy-encoding unit 107 entropy-encodes information required for moving image decoding, e.g., index information of a reference image used for inter-prediction, motion vector information, and position information of a block of a reconstructed image used for intra-prediction, in addition to the quantization results obtained by the quantization unit 106. According to the current embodiment of the present invention, the entropy-encoding unit 107 may also entropy-encode resolution adjustment information.

The inverse quantization unit 108 performs inverse quantization on the quantization results obtained by the quantization unit 106. More specifically, the inverse quantization unit 108 reconstructs frequency component values by multiplying the integers approximated by the quantization unit 106 by the quantization step size. The inverse transform unit 109 transforms inverse-quantization results obtained by the inverse quantization unit 108, i.e., the frequency component values, from the frequency domain into the spatial domain, in order to reconstruct the residue image between the current image and the predicted image. The addition unit 110 adds the residue image reconstructed by the inverse transform unit 109 to the predicted image generated by the motion compensation unit 102 or the spatial prediction unit 103, in order to generate a reconstructed image of the current image.

The compression unit 111 compresses the reconstructed image generated by the addition unit 110 by reducing a resolution, e.g., a bit resolution, of the reconstructed image, and stores the compressed reconstructed image (or compression image) in a memory 113. More specifically, the compression unit 111 expresses the reconstructed image generated by the addition unit 110 with a bit resolution of each of the pixels constituting the reconstructed image in predetermined block units by referring to resolution adjustment information, in order to compress the reconstructed image.

In the current embodiment of the present invention, the term "bit resolution" means the number of bits that express a value of each pixel. Throughout embodiments of the present invention, it can be easily understood by one of ordinary skill in the art that a bit resolution can be replaced with other terms such as a bit depth or a color depth. In other words, the compression unit 111 compresses the reconstructed image generated by the addition unit 110 by expressing a value of each pixel of the reconstructed image with a reduced bit resolution.

In general, a basic unit of access to the memory 113, i.e., the smallest unit of a read or write operation from or to the memory 113, is 8 bits, i.e., 1 byte. The compression unit 111 reduces the bit resolution of each of the pixels of the reconstructed image in predetermined block units, e.g., in units of 4×4 blocks. The total amount of data of a 4×4 block is 16 bytes when a value of a single pixel is expressed with 8 bits. For example, the total amount of data of a 4×4 block is 8 bytes when a value of a single pixel is expressed with 4 bits, the total amount of data of a 4×4 block is 10 bytes for a pixel value expressed with 5 bits, the total amount of data of a 4×4 block is 12 bytes for a pixel value expressed with 6 bits, and the total amount of data of a 4×4 block is 14 bytes for a pixel value expressed with 7 bits. When a value of each pixel of the reconstructed image generated by the addition unit 110 is composed of a Y value of 8 bits, a Cb value of 8 bits, and a Cr value of 8 bits, the compression unit 111 reduces the number of bits expressing each of the Y value, the Cb value, and the Cr value of each pixel of the reconstructed image, i.e., 8, to 6, 5, or 4. Thus, the Y value of 8 bits, the Cb value of 8 bits, and the Cr value of 8 bits are expressed as a Y value of 4, 5, or 6 bits, a Cb value of 4, 5, or 6 bits, and a Cr value of 4, 5, or 6 bits.

Although a bit resolution of each of pixels constituting an image is adjusted in 4×4 block units in the current embodiment of the present invention, it can be easily understood by one of ordinary skill in the art that a bit resolution of each of the pixels constituting an image can also be adjusted in various block units such as 2×2 block units, 8×8 block units, and 16×16 block units.

The reconstruction unit 112 reads the compression image stored in the memory 113 and expresses a value of each pixel of the compression image at the original bit resolution, in order to generate a final reconstructed image of the current image. More specifically, the reconstruction unit 112 expresses a value of each of the pixels constituting the compression image stored in the memory 113 in units of 4×4 blocks at the original bit resolution by referring to the resolution adjustment information, in order to generate the final reconstructed image of the current image.

In other words, the compression unit 111 expresses a pixel value at the original bit resolution with a pixel value at a reduced bit resolution, and the reconstruction unit 112 expresses the pixel value at the reduced bit resolution with the pixel value at the original bit resolution. For example, when the original bit resolution is 8 bits and a value of each pixel constituting the compression image stored in the memory 113 is composed of a Y value of 4, 5, or 6 bits, a Cb value of 4, 5, or 6 bits, and a Cr value of 4, 5, or 6 bits, the reconstruction unit 112 expresses all of the Y value, the Cb value, and the Cr value of each pixel of the compression image with 8 bits. The final reconstructed image generated by the reconstruction unit 112 is used as a reference image for future images following the current image or past images preceding the current image.

Figure 2:
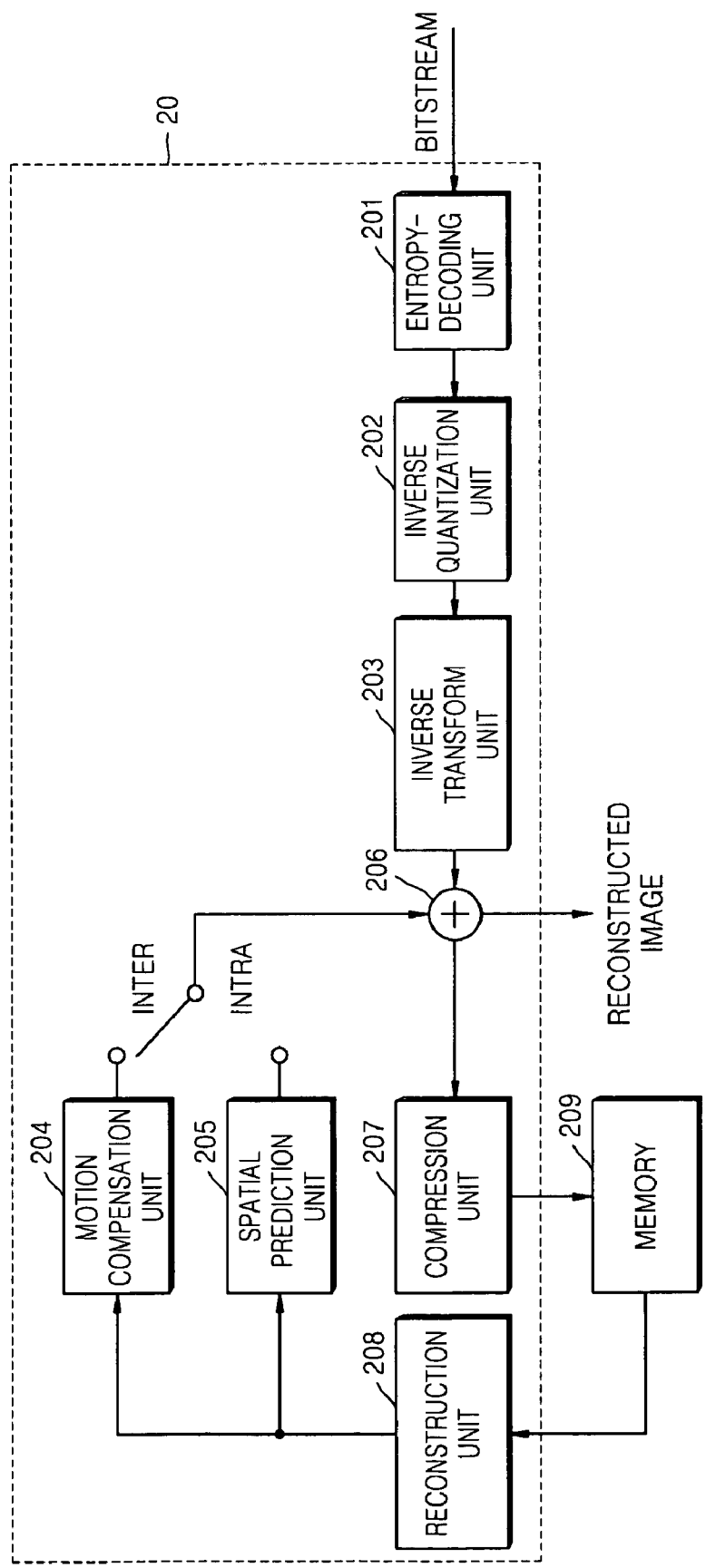
FIG. 2 is a block diagram of an image decoding apparatus according to an embodiment of the present invention.

FIG. 2 is a block diagram of an image decoding apparatus 20 according to an embodiment of the present invention. Referring to FIG. 2, the image decoding apparatus 20 includes an entropy-decoding unit 201, an inverse quantization unit 202, an inverse transform unit 203, a motion compensation unit 204, a spatial prediction unit 205, an addition unit 206, a compression unit 207, and a reconstruction unit 208. An image reconstruction process performed by the image decoding apparatus 20 is the same as that performed by the image encoding apparatus 10 illustrated in FIG. 1. Thus, although not provided below, a description for the image encoding apparatus 10 illustrated in FIG. 1 is also applied to the description for the image decoding apparatus 20 according to the current embodiment of the present invention.

The entropy-decoding unit 201 entropy-decodes a bitstream output from the image encoding apparatus 10 illustrated in FIG. 1, in order to reconstruct information required to decode an image and integers of image data. The inverse quantization unit 202 inversely quantizes the integers reconstructed by the entropy-decoding unit 201 in order to reconstruct frequency component values. The inverse transform unit 203 transforms the frequency component values reconstructed by the inverse quantization unit 202, from a frequency domain into a spatial domain, in order to reconstruct a residue image between a current image and a predicted image.

The motion compensation unit 204 generates a predicted image of the current image from at least one of a plurality of reference images generated by the reconstruction unit 208, by using a motion vector. For each of a plurality of blocks, corresponding to an intra mode, from among all blocks constituting the current image, the spatial prediction unit 205 predicts a value of the block of the current image from a value of a block of a reconstructed image located adjacent to the block of the current image, from among all blocks of a reconstructed image generated by the reconstruction unit 208, in order to generate a predicted image of the current image. The addition unit 206 adds the residue image reconstructed by the inverse transform unit 203 to the predicted image generated by the motion compensation unit 204 or the predicted image generated by the intra-prediction unit 205 in order to generate a reconstructed image of the current image.

The compression unit 207 compresses the reconstructed image generated by the addition unit 206 by expressing a value of each pixel of the reconstructed image at a reduced bit resolution and stores the compressed reconstructed image (or compression image) in a memory 209. More specifically, the compression unit 207 expresses a value of each pixel of the reconstructed image generated by the addition unit 206 at a reduced bit resolution in units of 4×4 blocks by referring to resolution adjustment information in order to compress the reconstructed image.

The reconstruction unit 208 reads the compression image stored in the memory 209 and expresses a value of each pixel of the compression image at the original bit resolution in order to generate a final reconstructed image of the current image. More specifically, the reconstruction unit 208 expresses a value of each pixel of the compression image stored in the memory 209 at the original bit resolution in units of 4×4 blocks by referring to resolution adjustment information, in order to generate the final reconstructed image of the current image.

According to the foregoing embodiments of the present invention, a reference image is compressed by reducing the bit resolution of the reference image and the compressed reference image is stored in an external memory, thereby reducing the amount of data of the reference image stored in the external memory. Thus, the number of cycles required for an image encoding apparatus or an image decoding apparatus to read or write a reference image from or to an external memory can be reduced. Such a reduction in the number of cycles required to access the external memory leads to a reduction in the number of operation cycles taken for the entire image encoding/decoding process, thereby implementing a low-power video codec.

Figures 3A, 3B:
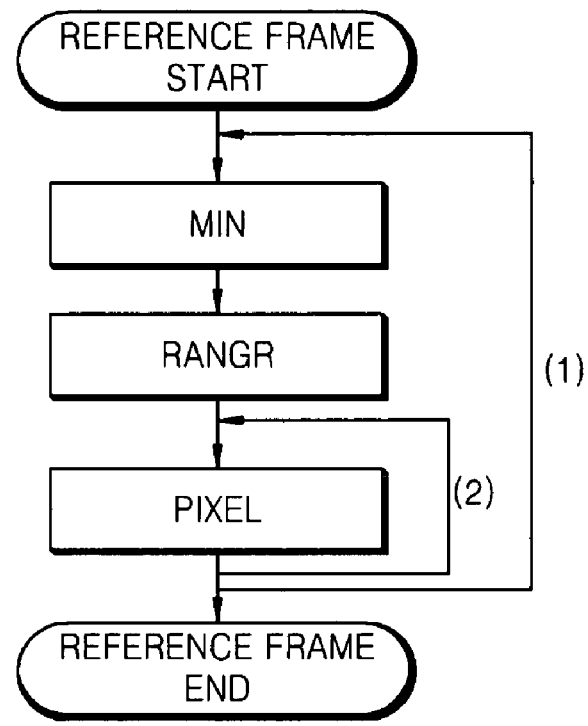
FIG. 3A illustrates a structure of a reference image compressed according to an embodiment of the present invention.
FIG. 3B illustrates the structure of the reference image, illustrated in FIG. 3A, in the form of a pseudo code.

FIG. 3A illustrates a structure of a reference image compressed according to an embodiment of the present invention. Referring to FIG. 3A, the compressed reference image includes a MIN field, a RANGE field, and a PIXEL field. Here, the MIN field may be replaced with a MAX field. In particular, the reference image illustrated in FIG. 3A is structured in such a manner that different fields are repeated. To reflect this structure, the structure of the reference image is illustrated in the form of a flowchart.

A minimum value (MIN) or a maximum value (MAX) among values of pixels included in each unit block, e.g., each 4×4 block, is recorded in the MIN field or the MAX field. A range value indicating a difference between the minimum value and the maximum value of each 4×4 block is recorded in the RANGE field. Values of 16 pixels of each 4×4 block are recorded in the PIXEL field. In other words, values of pixels expressed at a reduced bit resolution, i.e., quantization indices are recorded in the PIXEL field.

FIG. 3B illustrates the structure of the reference image, illustrated in FIG. 3A, in the form of a pseudo code. Among the items of the table illustrated in FIG. 3B, a "bit depth" indicates the number of bits expressing each field and a "reference number" indicates matches to numbers within the brackets "( )" illustrated in FIG. 3A. For example, "(2)" illustrated in FIG. 3A indicates that the PIXEL field is repeated for each of the 16 pixels of each 4×4 block and such repetition can be expressed as a portion corresponding to the reference number "(2)" of FIG. 3B in the form of a pseudo code. "BIT_DEPTH_PIXEL" of the PIXEL field indicates a reduced bit resolution and can be included in a header of a bitstream. A threshold value, a first sub range value and a second sub range value may also be included in the header in order to constitute resolution adjustment information together with the reduced bit resolution.

Figure 4:
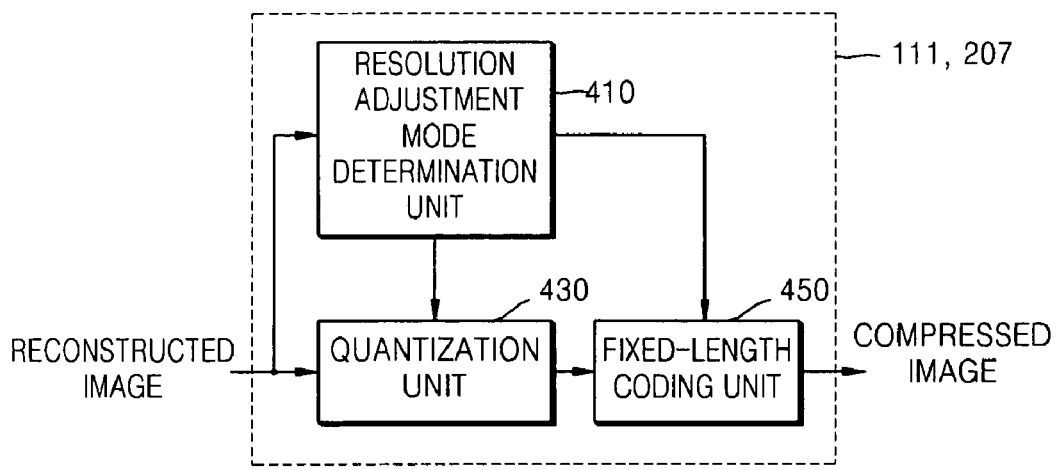
FIG. 4 is a block diagram of an image compression apparatus according to an embodiment of the present invention.

FIG. 4 is a block diagram of an image compression apparatus according to an embodiment of the present invention. The image compression apparatus illustrated in FIG. 4 corresponds to the compression unit 111 illustrated in FIG. 1 and the compression unit 207 illustrated in FIG. 2. Referring to FIG. 4, the image compression apparatus according to the current embodiment of the present invention, i.e., each of the compression unit 111 illustrated in FIG. 1 and the compression unit 207 illustrated in FIG. 2, includes a resolution adjustment mode determination unit 410, a quantization unit 430, and a fixed-length coding unit 450, and can be implemented as at least one single processor.

The resolution adjustment mode determination unit 410 determines a resolution adjustment mode by considering the distribution of values of pixels of a current unit block of a reconstructed image. At this time, a threshold value, the first sub range value, and the second sub range value or the threshold value may be input to the resolution adjustment mode determination unit 410. The threshold value, the first sub range value, and the second sub range value may be previously stored or may be set for each unit block variably according to the characteristics of the reconstructed image.

More specifically, the resolution adjustment mode determination unit 410 obtains a minimum value and a maximum value among values of pixels of a unit block, e.g., a 4×4 block, of the reconstructed image. At this time, when a value of each pixel is composed of a Y value, a Cb value, and a Cr value, a maximum value and a minimum value for each of the Y value, the Cb value, and the Cr value or only for the Y value may be obtained. The resolution adjustment mode determination unit 410 obtains a range value indicating a difference between the maximum value and the minimum value of the current unit block and compares the range value with the threshold value. If the range value is less than the threshold value, the resolution adjustment mode determination unit 410 determines a resolution adjustment mode of the current unit block as a uniform adjustment mode, e.g., a uniform quantization mode. When the range value is less than the threshold value, a value of each pixel of a unit block has high correlation with values of its neighboring pixels and thus a quantization error can be minimized with uniform quantization. On the other hand, when the range value is greater than or equal to the threshold value, the unit block is highly likely to include an edge component composed of at least two regions and thus denser quantization is performed in a region where the edge component exists.

Thus, when the range value is greater than or equal to the threshold value, the resolution adjustment mode determination unit 410 determines whether the remaining values of pixels of the current unit block, except for the maximum value and the minimum value, fall within the first sub range value from the minimum value or within the second sub range value from the maximum value. If the remaining values of pixels of the current unit block, except for the maximum value and the minimum value, fall within the first sub range value from the minimum value or within the second sub range value from the maximum value, the resolution adjustment mode determination unit 410 determines that the current unit block includes an edge component. Thus, in this case, the resolution adjustment mode determination unit 410 determines the resolution adjustment mode of the current unit block as a non-uniform adjustment mode, e.g., a dead-zone quantization mode, and sets a flag to '1'. If the remaining values of pixels of the current unit block, except for the maximum value and the minimum value, fall between the maximum value and the minimum value, the resolution adjustment mode determination unit 410 determines that the current unit block has no edge component. Thus, in this case, the resolution adjustment mode determination unit 410 determines the resolution adjustment mode of the current unit block as the uniform adjustment mode, i.e., the uniform quantization mode, and sets a flag to '0'.

Flag information is expressed as a least significant bit (LSB) in the range value and provided to the quantization unit 430. In other words, when the range value is greater than the threshold value, a LSB of '0' in the range value indicates a first resolution adjustment mode and a LSB of '1' in the range value indicates a second resolution adjustment mode.

The quantization unit 430 quantizes the current unit block according to the resolution adjustment mode determined by the resolution adjustment mode determination unit 410. A quantization process performed according to the determined resolution adjustment mode will now be described in more detail below.

When the resolution adjustment mode determined by the resolution adjustment mode determination unit 410 is the uniform adjustment mode, the quantization unit 430 performs uniform quantization on the current unit block. To this end, a previously-determined reduced bit resolution, one of a minimum value (MIN) and a maximum value (MAX), and a range value are input to the quantization unit 430, and the quantization unit 430 uniformly divides an interval between the minimum value and the maximum value for expressing at the reduced bit resolution and determines a boundary value that is closest to a value of each pixel of the current unit block from among boundary values obtained by uniform division as a quantization index of the value. When the original bit resolution of a reference image is 8 bits, each pixel of the reference image has a value between 0 and 255.

Figure 8A:
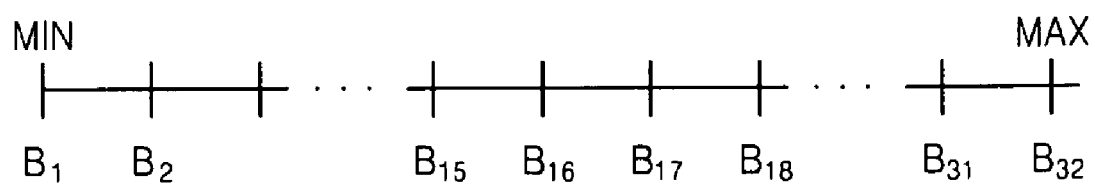
FIGS. 8A and 8B are diagrams for explaining uniform quantization and dead-zone quantization as applied to the present invention.

For a reduced bit resolution of 5 bits as illustrated in FIG. 8A, when the current unit block has a maximum value (MAX) of 167 and a minimum value (MIN) of 103, 32 boundary values $B_1$-$B_{32}$, i.e., 103, 105, 107, . . . , 167, are obtained by uniform division in order to express a pixel value range between the maximum value and the minimum value with 5 bits, and quantization indices '00000'-'11111' are assigned. Next, a value of each pixel of the current unit block is compared with the 32 boundary values and a boundary value that is closest to the value is determined as a quantization index of the value.

When the resolution adjustment mode determined by the resolution adjustment mode determination unit 410 is the non-uniform adjustment mode, the quantization unit 430 performs dead-zone quantization on the current unit block. To this end, a previously-determined reduced bit resolution, one of a minimum value (MIN) and a maximum value (MAX), a first sub range value, and a second range value are input to the quantization unit 430, and the quantization unit 430 uniformly divides an interval between the minimum value and the first sub range value and an interval between the maximum value and the second sub range value for expressing at a reduced bit resolution and determines a boundary value that is closest to a value of each pixel of the current unit block from among boundary values obtained by uniform division as a quantization index of the value. Here, an interval between the first sub range value and the second sub range value is a dead zone where no pixel value exists.

Figure 8B:
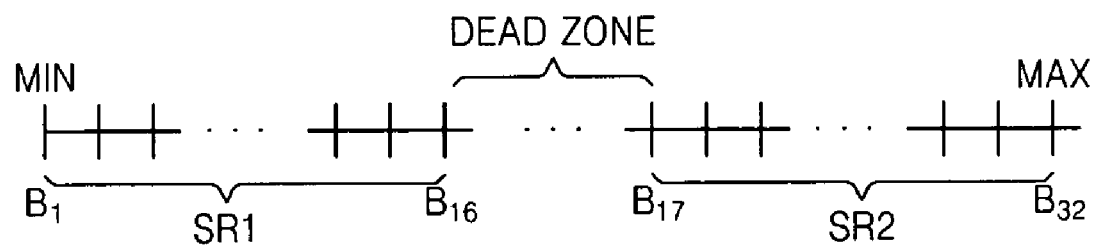

It is assumed that the original bit resolution of a reference image is 8 bits and a reduction in the bit resolution is set to 5 bits as illustrated in FIG. 8B. When the current unit block has a maximum value (MAX) of 183, a minimum value (MIN) of 87, a first sub range value (SR1) of 32, and a second sub range value (SR2) of 32, 32 boundary values $B_1$-$B_{32}$, i.e., 87, 89, . . ., 117, 119, 151, 153, . . . , 181, 183, are obtained by uniform division in order to express a pixel value range between the maximum value and the first sub range value and a pixel value range between the minimum value and the second sub range value with 5 bits, and quantization indices '00000'-'11111' are assigned. A value of each pixel of the current unit block is compared with the 32 boundary values and a boundary value that is closest to the value is determined as a quantization index of the value. Here, an interval between a boundary value of 119, corresponding to the first sub range value, and a boundary value of 151, corresponding to the second sub range value, is a dead zone.

Here, the reduced bit resolution of the reference image is previously determined by simulation based on the amount of computation required for quantization and a quantization error and is provided through at least one of a sequence header, a group-of-pictures (GOP) header, a picture header, and a macroblock header or is previously stored in the quantization unit 430 or the memory 117 or 209. The threshold value is previously set to an optimal value by simulation based on a quantization error generated according to selection of uniform quantization or dead-zone quantization and is provided through a header or is previously stored in the quantization unit 430 or the memory 117 or 209. The first sub range value and the second sub range value are previously set to optimal values by simulation based on a quantization error generated during dead-zone quantization or are set variably according to the range value of the unit block.

A total of 128 bits are required to store a single 4×4 block in the memory 113 or 209 prior to quantization, whereas by performing uniform quantization or dead-zone quantization, a total of 96 bits including 8 bits for the minimum value or the maximum value, 8 bits for the range value, and 80 bits for quantization indices of 16 pixels are required. Thus, the number of operation cycles required to access data of an external memory can be reduced. In particular, by selecting dead-zone quantization based on the characteristics of an image according to pixel value distribution, for a unit block including an edge component, an interval where pixel values exist is more precisely divided to determine quantization indices, thereby minimizing a quantization error in spite of bit resolution reduction. Consequently, improvement can be achieved in a peak signal-to-noise ratio (PSNR), which is a barometer of objective display quality as well as in subjective display quality.

The fixed-length coding unit 450 performs fixed-length coding on a range value and a representative value obtained by the resolution adjustment mode determination unit 410 and a quantization index for a value of each pixel of the current unit block on which uniform quantization or dead-zone quantization is performed, in such a way to correspond to a basic access unit of the memory 113 or 209. The representative value is one of a minimum value and a maximum value, and the minimum value will be used as the representative value as an example herein.

Figure 5:
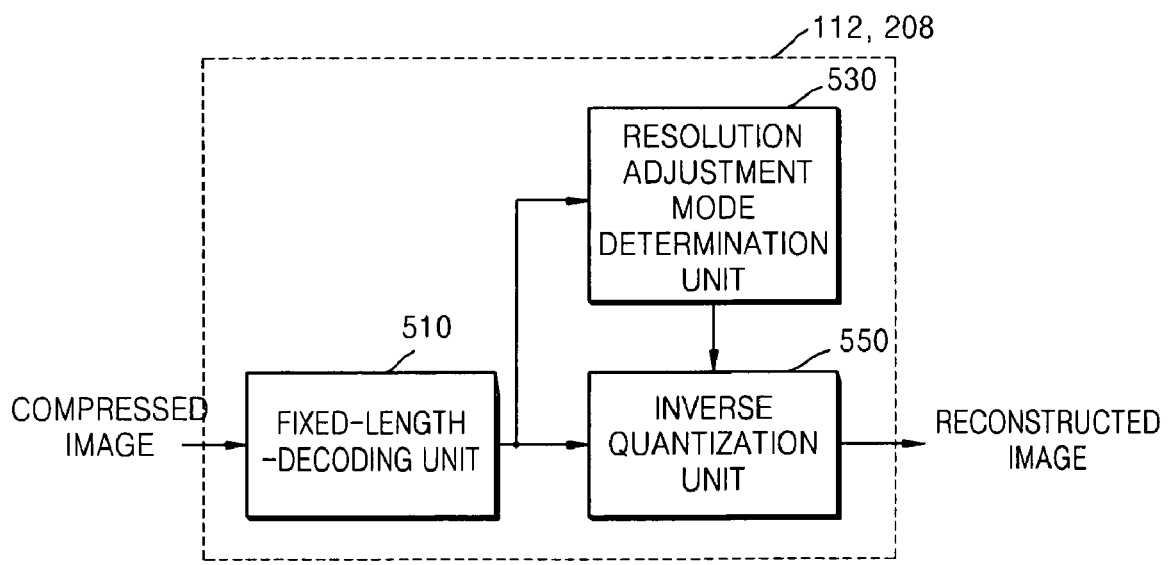
FIG. 5 is a block diagram of an image reconstruction apparatus according to an embodiment of the present invention.

FIG. 5 is a block diagram of an image reconstruction apparatus according to an embodiment of the present invention. In particular, the image reconstruction apparatus illustrated in FIG. 5 corresponds to the reconstruction unit 112 illustrated in FIG. 1 and the reconstruction unit 208 illustrated in FIG. 1. Referring to FIG. 5, the image reconstruction apparatus according to the current embodiment of the present invention includes a fixed-length decoding unit 510, a resolution adjustment mode determination unit 530, and an inverse quantization unit 550, and may be implemented as at least one single processor.

The fixed-length decoding unit 510 reads a compression image stored in the memory 113 or 209 in units of unit blocks, e.g., 4×4 blocks, extracts a fixed-length encoding value of each pixel of a read 4×4 block, and performs fixed-length decoding on the extracted fixed-length encoding value, in order to reconstruct a quantization index, a representative value, i.e., a minimum value, and a range value for a value of each pixel.

The resolution adjustment mode determination unit 530 compares the range value reconstructed by the fixed-length decoding unit 510 with a threshold value. If the range value is greater than or equal to the threshold value, the resolution adjustment mode determination unit 530 checks a flag, i.e., a LSB of the range value in order to determine a resolution adjustment mode. At this time, the threshold value, a first sub range value, and a second sub range value, or the threshold value may be input to the resolution adjustment mode determination unit 530, the first sub range value and the second sub range value may be previously stored or may be set for each unit block variably according to the characteristics of the reconstructed image.

More specifically, if the range value is less than the threshold value, the resolution adjustment mode determination unit 530 determines the resolution adjustment mode as a uniform adjustment mode, i.e., a uniform inverse quantization mode. If the range value is greater than or equal to the threshold value, the resolution adjustment mode determination unit 530 checks the LSB of the range value. If the LSB of the range value is '0', it means that the flag is set to '0' and thus the uniform adjustment mode, i.e., the uniform inverse quantization mode is determined as the resolution adjustment mode. If the LSB of the range value is '1', it means that the flag is set to '1' and thus a non-uniform adjustment mode, i.e., a dead-zone inverse quantization mode is determined as the resolution adjustment mode.

The inverse quantization unit 550 inversely quantizes the quantization index for the value of each pixel of the current unit block, which is reconstructed by the fixed-length decoding unit 510, according to the resolution adjustment mode determined by the resolution adjustment mode determination unit 530. An inverse quantization process performed according to the determined resolution adjustment mode will now be described in more detail below.

When the resolution adjustment mode determined by the resolution adjustment mode determination unit-530 is the uniform adjustment mode, the inverse quantization unit 550 performs uniform inverse quantization on the current unit block. To this end, the reconstructed minimum value and range value may be input to the inverse quantization unit 550 and the inverse quantization unit 550 obtains a maximum value from the range value. The inverse quantization unit 550 uniformly divides an interval between the minimum value and the maximum value for expressing at a reduced bit resolution and determines a boundary value, corresponding to the quantization index for the value of each pixel of the current unit block, from among boundary values obtained by uniform division as a reconstruction value of the pixel.

When the resolution adjustment mode determined by the resolution adjustment mode determination unit 530 is the non-uniform adjustment mode, the inverse quantization unit 550 performs dead-zone inverse quantization on the current unit block. To this end, the reconstructed minimum value and range value is input to the inverse quantization unit 550 and the inverse quantization unit 550 obtains a maximum value from the range value. A first sub range value and a second sub range value are input to the inverse quantization unit 550, and the inverse quantization unit 550 uniformly divides an interval between the minimum value and the first sub range value and an interval between the maximum value and the second sub range value for expressing at a reduced bit resolution and determines a boundary value, corresponding to the quantization index for the value of each pixel of the current unit block, from among boundary values obtained by uniform division as a reconstruction value of the pixel.

Figure 6:
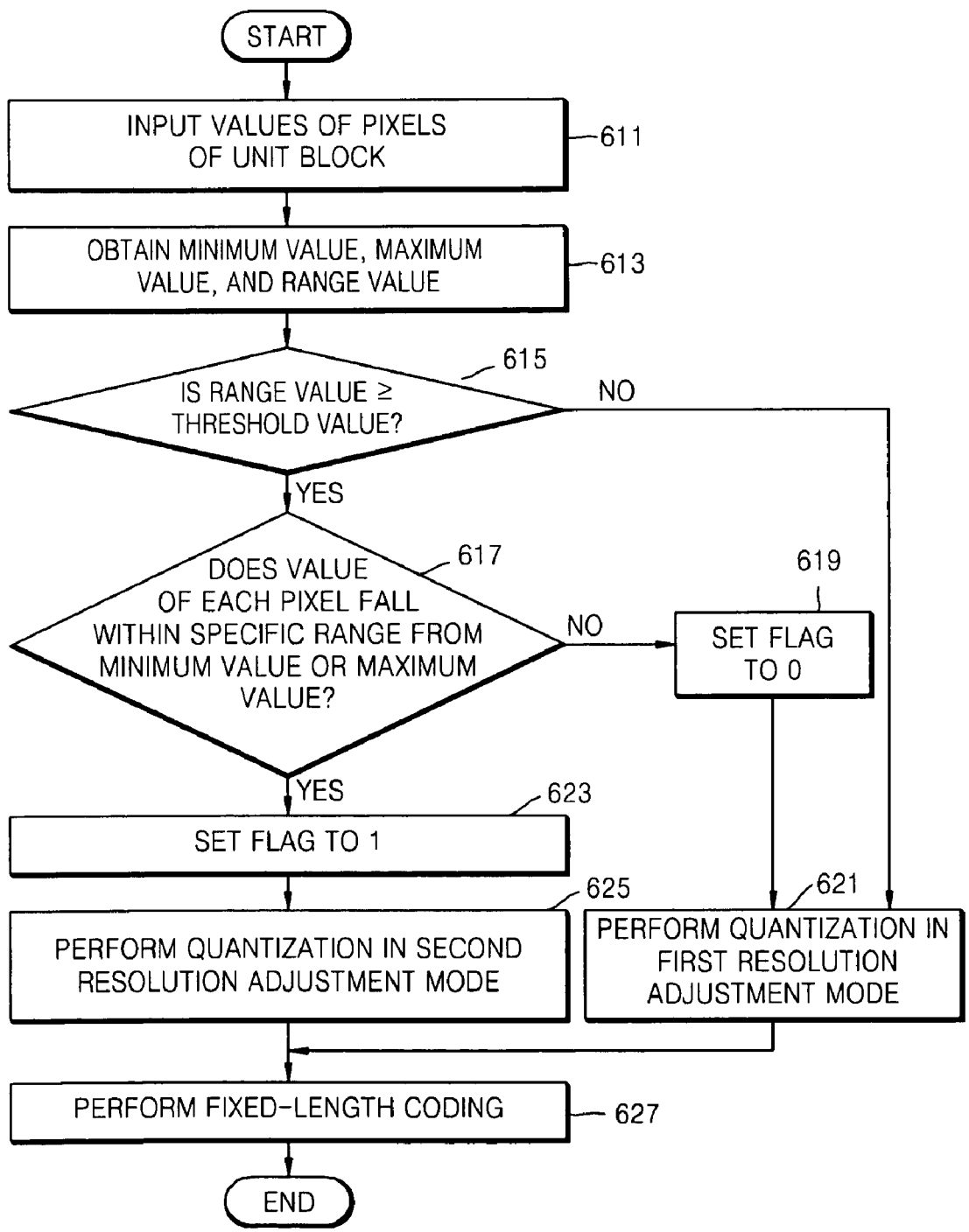
FIG. 6 is a flowchart of an image compression method according to an embodiment of the present invention.

FIG. 6 is a flowchart of an image compression method according to an embodiment of the present invention.

Referring to FIG. 6, the values of pixels of a unit block of a reference image are input in operation 611, and a minimum value and a maximum value from among the values of the pixels of the unit block are obtained and a range value indicating a difference between the minimum value and the maximum value is obtained in operation 613.

The range value is compared with a threshold value in operation 615. If the range value is less than the threshold value, the unit block is quantized in a first resolution adjustment mode, in operation 621. Otherwise, if the range value is greater than or equal to the threshold value, it is determined whether the value of each pixel of the unit block falls within a specific range from the minimum value or the maximum value, in operation 617.

If the value of each pixel of the unit block does not fall within the specific range from the minimum value or the maximum value, a LSB of the range value is set to '0' in order to set a flag to '0', in operation 619, and the unit block is quantized in the first resolution adjustment mode, in operation 621. Otherwise, if the value of each pixel of the unit block falls within the specific range from the minimum value or the maximum value, the LSB of the range value is set to '1' in order to set the flag to '1', in operation 623, and the unit block is quantized in a second resolution adjustment mode, in operation 625.

In operation 627, fixed-length coding is performed on the quantization index, the representative value, and the range value for a value of each pixel of each unit block of a reference image compressed at a reduced bit resolution according to the first resolution adjustment mode or the second resolution adjustment mode, and a fixed-length coding value is stored in the memory 113 or 209.

Here, the first resolution adjustment mode is a uniform adjustment mode, the second resolution adjustment mode is a non-uniform adjustment mode, and the representative value is one of the minimum value and the maximum value. Herein, the minimum value is used as the representative value as an example.

Figure 7:
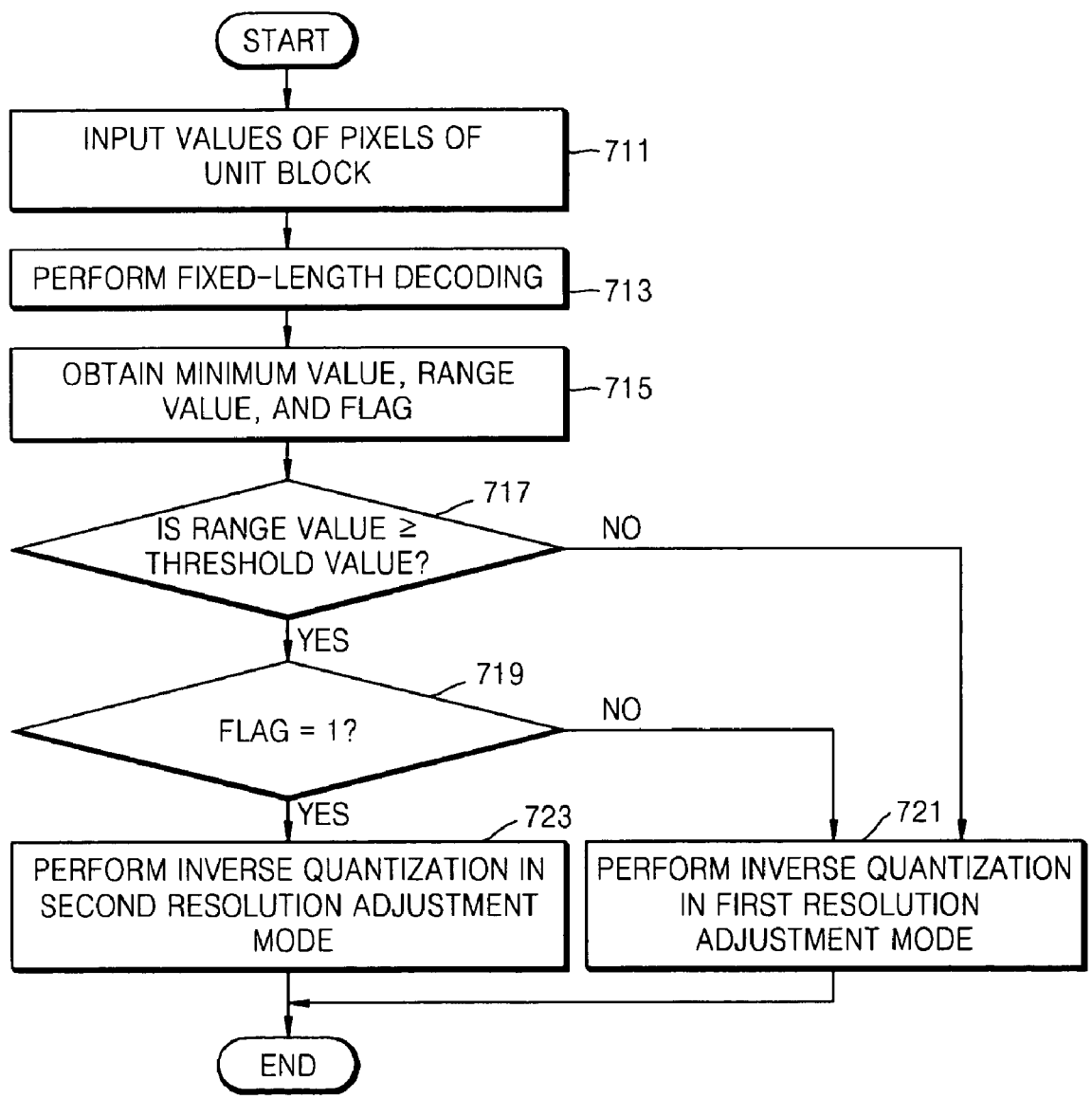
FIG. 7 is a flowchart of an image reconstruction method according to an embodiment of the present invention.

FIG. 7 is a flowchart of an image reconstruction method according to an embodiment of the present invention.

Referring to FIG. 7, the values of pixels of a unit block of a reference image read from the memory 113 or 209 are input, in operation 711, and fixed-length decoding is performed on the values of the pixels, in operation 713. A quantization index, a representative value, and a range value of each of the pixels are obtained from fixed-length decoding values, in operation 715.

The range value is compared with a threshold value in operation 717. If the range value is less than the threshold value, inverse quantization is performed on the unit block in a first resolution adjustment mode, in operation 721. Otherwise, if the range value is greater than or equal to the threshold value, a LSB of the range value is checked in order to check a flag, in operation 719.

If the flag is set to '0', inverse quantization is performed on the unit block in the first resolution adjustment mode, in operation 721. Otherwise, if the flag is set to '1', inverse quantization is performed on the unit block in a second resolution adjustment mode, in operation 723.

Here, the first resolution adjustment mode is a uniform adjustment mode, the second resolution adjustment mode is a non-uniform adjustment mode, and the representative value is one of the minimum value and the maximum value. Herein, the minimum value is used as the representative value as an example.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as media carrying or including carrier waves, as well as elements of the Internet, for example. Thus, the medium may be such a defined and measurable structure including or carrying a signal or information, such as a device carrying a bitstream, for example, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

While aspects of the present invention has been particularly shown and described with reference to differing embodiments thereof, it should be understood that these exemplary embodiments should be considered in a descriptive sense only and not for purposes of limitation. Descriptions of features or aspects within each embodiment should typically be considered as available for other similar features or aspects in the remaining embodiments.

Thus, although a few embodiments have been shown and described, it would be appreciated by those skilled in the art that changes may be made in these embodiments without departing from the principles and spirit of the invention, the scope of which is defined in the claims and their equivalents.

What is claimed is:

1. An image encoding apparatus comprising:
a compression unit that compresses a reference image by reducing a resolution of the reference image in a resolution adjustment mode determined from among at least two resolution adjustment modes according to a distribution of values of pixels of the reference image, and that provides the compressed reference image to a memory;

a reconstruction unit that reconstructs the reference image by increasing a resolution of the compressed reference image stored in the memory to an original resolution;

a predictive encoding unit that performs predictive encoding on a current image by using the reconstructed reference image; and a predictive decoding unit that generates the reference image by performing decoding on the predictive encoded current image, and providing the generated reference image to the compression unit.

2. The image encoding apparatus of claim 1, wherein the compression unit compares a range value for values of pixels constituting a current unit block of the reference image with a threshold value, reduces the resolution of the reference image in a uniform adjustment mode, if the range value is less than the threshold value, and reduces the resolution of the reference image in one of a uniform adjustment mode and a non-uniform adjustment mode, if the range value is greater than or equal to the threshold value.

3. The image encoding apparatus of claim 2, wherein the compression unit determines the resolution adjustment mode according to whether a value of each of the pixels constituting the current unit block of the reference image falls within a first sub range value from a minimum value or within a second sub range value from a maximum value, if the range value is greater than or equal to the threshold value.

4. The image encoding apparatus of claim 1, wherein the compression unit reduces the resolution of the reference image in a non-uniform adjustment mode, if a current unit block of the reference image includes an edge component, or reduces the resolution of the reference image in a uniform adjustment mode, if the current unit block of the reference image does not include the edge component.

5. The image encoding apparatus of claim 1, wherein the compression unit comprises:

an adjustment mode determination unit that determines one of uniform quantization and dead-zone quantization as the resolution adjustment mode, according to a result of comparison of a range value, for values of pixels constituting a current unit block of the reference image, with a threshold value and a result of comparison of the values of the pixels with a first sub range value and a second sub range value;

a quantization unit that performs quantization in order to express each of the values of the pixels of the current unit block at a reduced bit resolution according to the determined resolution adjustment mode; and a fixed-length coding unit that performs fixed-length coding on a quantization index, a representative value, and the range value of the current unit block on which uniform quantization or dead-zone quantization is performed.

6. The image encoding apparatus of claim 1, wherein the reconstruction unit comprises:

a fixed-length decoding unit that reconstructs a quantization index, a representative value, and a range value of a current unit block of the compressed reference image by performing fixed-length decoding on the current unit block;

a resolution adjustment mode determination unit that determines one of uniform inverse quantization and dead-zone inverse quantization as the resolution adjustment mode, according to a result of comparison of the reconstructed range value of the current unit block with a threshold value and a result of checking of a flag; and an inverse quantization unit that inversely quantizes the quantization index of the current unit block in order to express each of the values of the pixels of the current unit block at the original bit resolution according to the determined resolution adjustment mode.

7. An image decoding apparatus comprising:

a compression unit that compresses a reference image by reducing a resolution of the reference image in a resolution adjustment mode determined from among at least two resolution adjustment modes according to a distribution of values of pixels of the reference image, and that provides the compressed reference image to a memory;

a reconstruction unit that reconstructs the reference image by increasing a resolution of the compressed reference image stored in the memory to an original resolution; and a predictive decoding unit that generates the reference image by performing predictive decoding on a bitstream by using the reconstructed reference image.

8. The image decoding apparatus of claim 7, wherein the compression unit compares a range value, for values of pixels constituting a current unit block of the reference image, with a threshold value, reduces the resolution of the reference image in a uniform adjustment mode, if the range value is less than the threshold value, and reduces the resolution of the reference image in one of the uniform adjustment mode and a non-uniform adjustment mode, if the range value is greater than or equal to the threshold value.

9. The image decoding apparatus of claim 7, wherein the compression unit determines the resolution adjustment mode according to whether a value of each of the pixels constituting the current unit block of the reference image falls within a first sub range value from a minimum value or within a second sub range value from a maximum value, if the range value is greater than or equal to the threshold value.

10. The image decoding apparatus of claim 7, wherein the compression unit reduces the resolution of the reference image in the non-uniform adjustment mode, if a current unit block of the reference image includes an edge component, or reduces the resolution of the reference image in the uniform adjustment mode, if the current unit block of the reference image does not include the edge component.

11. The image decoding apparatus of claim 7, wherein the compression unit comprises:

an adjustment mode determination unit that determines one of uniform quantization and dead-zone quantization as the resolution adjustment mode, according to a result of comparison of a range value, for values of pixels constituting a current unit block of the reference image, with a threshold value and a result of comparison of the values of the pixels with a first sub range value and a second sub range value;

a quantization unit that performs quantization in order to express each of the values of the pixels of the current unit block at a reduced bit resolution, according to the determined resolution adjustment mode; and a fixed-length coding unit that performs fixed-length coding on a quantization index, a representative value, and the range value of the current unit block on which uniform quantization or dead-zone quantization is performed.

12. The image decoding apparatus of claim 7, wherein the reconstruction unit comprises:

a fixed-length decoding unit that reconstructs a quantization index, a representative value, and a range value of a current unit block of the compressed reference image by performing fixed-length decoding on the current unit block;

a resolution adjustment mode determination unit that determines one of uniform inverse quantization and dead-zone inverse quantization as the resolution adjustment mode, according to a result of comparison of the reconstructed range value of the current unit block with a threshold value and a result of checking of a flag; and an inverse quantization unit that inversely quantizes the quantization index of the current unit block in order to express each of the values of the pixels of the current unit block at the original bit resolution, according to the determined resolution adjustment mode.

* * * * *

UNITED STATES PATENT AND TRADEMARK OFFICE
CERTIFICATE OF CORRECTION

| | |
|---|---|
| PATENT NO. | : 8,126,282 B2 |
| APPLICATION NO. | : 12/289608 |
| DATED | : February 28, 2012 |
| INVENTOR(S) | : Jae-woo Jung et al. |

It is certified that error appears in the above-identified patent and that said Letters Patent is hereby corrected as shown below:

Title page Item [75] Line 5, Delete "Hwanseong-si" and insert -- Hwaseong-si --, therefor.

Signed and Sealed this
Twenty-second Day of May, 2012

David J. Kappos
*Director of the United States Patent and Trademark Office*